(No Model.)
W. REINHARDT.
ARTICLE OF CONFECTIONERY.
No. 312,761. Patented Feb. 24, 1885.
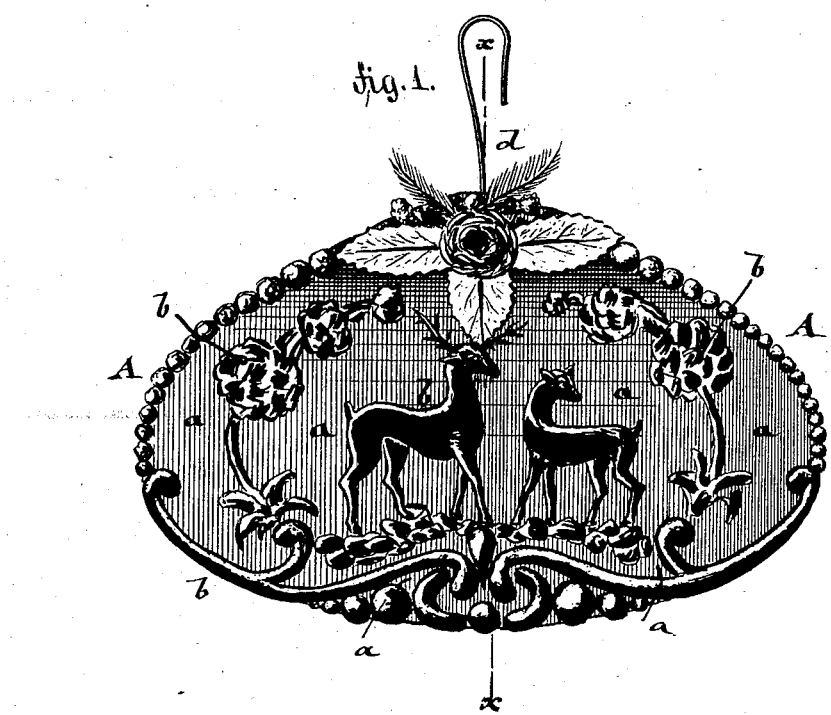
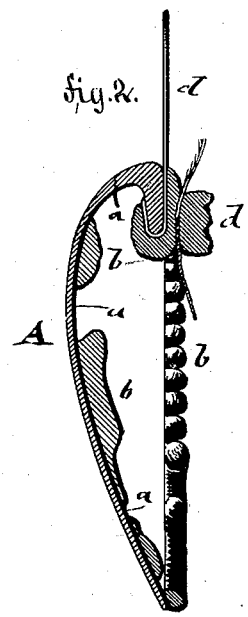
WITNESSES:
INVENTOR
Wilhelm Reinhardt
BY
Goepel & Raegener
ATTORNEYS.

United States Patent Office.

WILHELM REINHARDT, OF NEW YORK, N. Y., ASSIGNOR OF ONE-HALF TO ERNST KAUFMANN, OF SAME PLACE.

ARTICLE OF CONFECTIONERY.

SPECIFICATION forming part of Letters Patent No. 312,761, dated February 24, 1885.

Application filed August 11, 1884. (No model.)

*To all whom it may concern:*

Be it known that I, WILHELM REINHARDT, of the city, county, and State of New York, have invented certain new and useful Improvements in Articles of Confectionery, of which the following is a specification.

This invention has reference to an improved article of confectionery to be used as a mantel-piece ornament, trimming for Christmas-trees, and the like; and the invention consists of a mussel or other shell the inner surface of which is covered with a layer or ground of suitable color on which relief-designs in icing or other suitable material are placed.

In the accompanying drawings, Figure 1 represents a front view of my improved article of confectionery. Fig. 2 is a vertical transverse section of the same on line *x x*, Fig. 1.

Similar letters of reference indicate corresponding parts.

A in the drawings represents a mussel or other shell of suitable size, which forms the foundation of my improved article of confectionery. The inner surface of the shell A is covered with a ground or layer, *a*, of any suitable color, on which the designs *b* are placed in relief by means of icing or other suitable material. The larger sizes of shells when thus ornamented form an attractive ornament for the mantel-piece, while the smaller sizes of shells may be used as an ornament for Christmas-trees, in which case they are suspended by suitable hooks, ribbons, or other devices, *d*, attached to the middle part of the thicker edges.

I am aware that shells of all kinds have been painted on their inner surfaces in suitable colors and designs, and used as articles of ornament for the mantel-piece, and I therefore do not claim this feature.

Having thus described my invention, I claim as new and desire to secure by Letters Patent—

1. An article of confectionery consisting of a mussel or other shell the inner surface of which is covered with a layer or ground of suitable color, and designs in relief placed on said ground, substantially as set forth.

2. An article of confectionery consisting of a mussel or other shell the inner surface of which is covered with a layer or ground of suitable color, and with designs in relief, and of a suspension device attached to the middle part of its thicker edge, substantially as specified.

In testimony that I claim the foregoing as my invention I have signed my name in presence of two subscribing witnesses.

WILHELM REINHARDT.

Witnesses:
PAUL GOEPEL,
SIDNEY MANN.